United States Patent Office 3,298,219
Patented Jan. 17, 1967

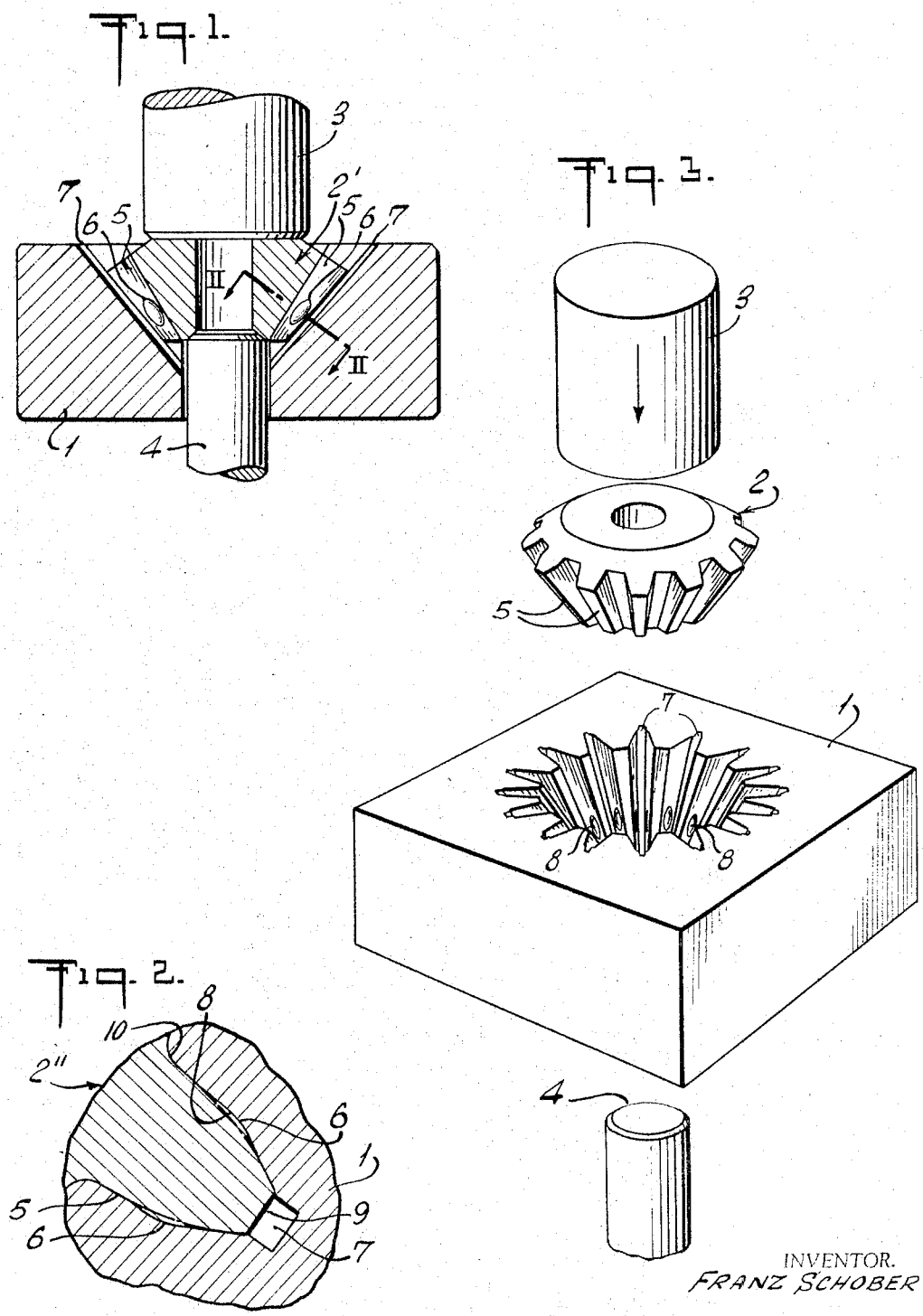

3,298,219
METHOD AND DEVICE FOR PRODUCING ACTIVE PROFILES ON BEVEL GEARS
Franz Schober, Munich-Pasing, Germany, assignor to Bayerisches Leichlmetallwerk K.G., Munich, Germany
Filed Feb. 28, 1964, Ser. No. 348,208
Claims priority, application Germany, Apr. 24, 1963, B 71,606
11 Claims. (Cl. 72—377)

The present invention relates to a method and a device for producing bevel gears, and more particularly for producing active, preferably centrally located, profiles on both flanks of gears, by means of a calibrating mold.

Efforts have been made to form the active tooth profiles of high-quality gears in a stressed state so as to avoid the gears acting on the tooth crests or roots, by allowing the bearing capacity to act in the central region along the tooth length.

It is known to modify or correct the tooth profiles by shaving or similar machining processes. With regard to the amount of crown, the so produced active profiles extend over the entire length and width of the tooth. Such an accurate treatment of the tooth flanks is, however, relatively expensive in high precision gears in view of the very small machining tolerances required.

The present invention has a superficial resemblance to the subject matter of applicant's earlier U.S. Patent No. 2,964,838 dated December 20, 1960, entitled "Method of Pressing Bevel Gear Wheels and the Like From Steel." In this earlier patent, an elongated blank is pressed in a die matrix having a closed end face and a toothed annular surface, so as to cause the material of the blank to flow from said end portion toward said annular surface, whereby the grain structure of the gear teeth thus formed will extend in a direction parallel to the annular surface.

Applicant's earlier patent does not relate to the method and device disclosed and claimed herein for forming active tooth profiles on the tooth flanks of pressed gears, particularly bevel gears. While the afore-mentioned patent may be defined as relating to gear manufacturing as such, the present case relates to refining or rather meliorating the gears, representing an improvement over or in addition to the manufacturing proper.

It is the object of the present invention to eliminate the drawbacks of hitherto known methods and to provide a method and a device for economically producing or modifying bevel-gear profiles.

It is a further object of the invention to apply cold-working methods, e.g. pressing, to bevel-gear treatments whereby to produce profiles simultaneously on both tooth flanks, which are centrally located thereon.

According to one of the major features of the invention, gear material is being displaced by amounts within the specified tolerance limit at the edge portions of the bevel-gear tooth flanks, especially at the roots. This is done by cold working, such as pressing, for example, in an appropriately shaped sizing or calibrating mold or die. The displaced material is moved into predetermined portions of the active tooth-flank profiles.

It is another feature of the invention that all teeth of a bevel gear are treated simultaneously and in a relatively short time. It should be noted that the non-cutting col-forming process also effects a hardening of the active profiles, resulting in increased resistance to wear and tear. The tooth roots are also subject to a certain degree of cold-forming; this proves to be an advantage because a surface stabilization is achieved thereby.

According to a preferred manner of practicing the method of the invention, the amount of crown of the tooth flanks extends in the centers of the flanks or, more preferably, extends toward or within the lower third portions of the tooth lengths in their unstressed state.

Experiments have shown that bevel gears made by the method and/or in the device according to the invention have a maximum load-bearing capacity and improved running properties. This is primarily due to the active profiles and the cold shaped surfaces of the tooth flanks.

Active profiles of all forms and positions may be produced according to the invention by appropriate recesses applied to the calibrating mold. The bevel gears can thus be put to various uses requiring varying shapes and arrangements of active profiles.

According to a major feature of the invention, the internal faces of the mold are formed with depressions or recesses incorporating the predetermined tolerances, preferably in their central regions, while the edge portions are correspondingly raised. The material of the bevel gears is consequently displaced by the mold at the lower portions 10 of the tooth flanks and moved into central flank portions where the tooth is active.

Other objects and many of the attendant advantages of the invention will be readily appreciated as the same becomes better understood by reference to the following detailed description, when considered with the accompanying drawing, wherein:

FIG. 1 is a somewhat schematic vertical cross section of a sizing or calibrating mold according to the invention;

FIG. 2 is a sectional view taken on line II—II of FIG. 1, on a substantially enlarged scale and having exaggerated height and proportions at the active tooth profile; and FIG. 3 is a schematic perspective view of practicing the method according to the invention.

The drawing, and more particularly FIG. 3, shows a calibrating mold or die 1 in which will be inserted a prefabricated bevel gear 2, made separately in a preceding operation, and to be treated according to the invention. The gear may be driven or pushed into the mold by conventional means (not illustrated), or with a punch 3 to be described hereunder in more detail.

The preformed bevel gear 2 appearing in FIG. 3 before its treatment is shown in FIG. 1 during the pressing as gear 2' and in the sectional view of FIG. 2, after the pressing, as gear 2'' having an active profile 6 formed on both sides of one of its teeth 5 (delimited by a broken line which corresponds to the tooth profile of a prefabricated gear before the inventive treatment). The profile 6 of the actual gear can hardly be seen from the side of the tooth since, even in its central region, the bulge does not exceed one hundredth of a millimeter. Therefore, FIG. 2 is greatly exaggerated as to proportions with a view to illustrating the inventive method and device.

The punch 3, serving to accomplish the cold-forming which produces the novel active tooth profiles 6, does not need to have a centering member. Provisions are made for the preformed gear 2 to fit with its teeth into the appropriate recesses of the mold 1. The shape of the preformed gear assures concentric and symmetrical cold forming when the punch 3 bears down on the gear top face, as shown in FIG. 1. This can be done in a press or like machine known per se. In this step, sufficient pressure is applied to the punch 3, contacting the top face of the gear 2', so that the latter is pressed into the mold 1 until the required cold deformation is accomplished.

The mold or die 1 has shallow depressions or recesses 8 (FIG. 2) which allow in the gear teeth 5 the formation of bulges or active profiles 6 (shown in FIG. 1 as a broken-line oval surface).

Since the tooth crests 9 have no operative function while the gear is in meshing engagement, rough tolerances are acceptable. Clearances 7 are provided in mold 1 in the tooth-crest regions of gear 2' for allowing expansion of the gear teeth. This is done because the crests do not require any corrective treatment. Thus, the clearances 7 have no effect on the cold-forming of the active tooth flanks 6. The clearances 7 prevent contact between said tooth crests and the bottoms of the mold depressions. The gear 2' touches the mold only at the surfaces to be formed, that is at the tooth flanks and at the active profiles 6. Moderate cold forming of the tooth roots may prove advantageous thanks to the surface stabilization or stiffening resulting therefrom.

When the punch 3 has performed its pressing function on gear 2', an ejector 4 or similar member can be used to remove the gear from the mold. The ejector does not take part in the forming and pressing process. It may be spring-biased by conventional means (not shown) in a way that it contacts the gear 2' from below, as illustrated. It is possible to have the movement of the ejector 4 controlled by a cam or similar device known per se. Since this detail has no bearing on the production of active profiles according to the invention, no further details appear to be necessary.

It will be understood that the depressions 8 and bulges 6 have been shown as a matter of example only. Their shapes, locations and proportions in the mold may vary in accordance with the requirements for which the gears will be used.

In a preferred form of the inventive mold, the depressions or recesses 8 are provided in the central regions of the tooth flanks to be calibrated, as shown in FIG. 2. The edge portions become correspondingly raised.

According to another inventive feature, the amount of the tooth-flank crown forming the active profile is made to extend only in the region of the lower third of the tooth length (as schematically shown in FIG. 1). It is essential that tooth flanks should be avoided which make contact at their edges.

It will be understood that the foregoing disclosure relates only to a preferred embodiment of the inventive method and device, and that it is intended to cover all changes and modifications of the described example which do not constitute departures from the spirit and scope of the invention as set forth in the appended claims.

I claim:

1. A method for producing active profiles on flanks of bevel gears in cold state thereof, comprising the steps of preforming a bevel gear, driving the preformed gear into a calibrating mold, exerting pressure on the entire gear axially thereof so as to displace by tolerance amounts some of the gear material in the region of the tooth flanks from the lower flank portions of the teeth and forming active profiles on said flanks without altering the working depth of the teeth of said gear, whereby active tooth profiles are formed thereon, and ejecting the treated gear from the mold.

2. A method according to claim 1, wherein the displacing step is carried out at centrally located profile portions of the tooth flanks.

3. The method according to claim 2 wherein the displacing step is carried out simultaneously on both flanks of the same gear tooth.

4. A method according to claim 1, wherein the displacing step is carried out in the region of the lower third of the tooth length.

5. A method according to claim 1, wherein the displacing step is carried out at the roots of the gear teeth.

6. A device for producing active profiles on flanks of bevel gears in cold state of said gears, comprising a calibrating mold having receding portions corresponding to the teeth of a preformed bevel gear to be treated, portions of said device corresponding to the flank portions of said gear and having a profile adapted to displace material from the lower flank portions of said gear by tolerance amounts, the receding portions being provided with shallow depressions adapted to receive said tolerance amounts of said displaced gear material in the region of the tooth flanks from the lower flank portions of the teeth and forming active profiles on said flanks without altering the working depth of the teeth of said preformed gear, upon inserting the preformed gear into the mold and exerting pressure on the entire gear axially thereof whereby active tooth profiles are formed on the tooth flanks.

7. A device according to claim 6, wherein the shallow depressions are provided at centrally located profile portions of the tooth flanks.

8. A device according to claim 7, wherein the shallow depressions are provided on both flanks of the same gear tooth.

9. A device according to claim 6, wherein the shallow depressions are provided in the region of the lower third of the tooth length.

10. A device according to claim 6, wherein the shallow depressions are provided at the roots of the gear teeth.

11. A device according to claim 6, wherein the receding portions of the mold are provided with radial clearances for allowing some of the displaced gear material to move into the tooth crest regions of the treated gear while pressure is exerted thereon.

References Cited by the Examiner

UNITED STATES PATENTS

| | | | |
|---|---|---|---|
| 600,994 | 3/1898 | See | 72—39 |
| 1,360,358 | 11/1920 | Beall | 25—159.2 |
| 1,907,897 | 5/1933 | Swegles | 72—340 |
| 2,964,838 | 12/1960 | Schober | 29—159.2 |
| 3,087,364 | 4/1963 | Witmer | 29—426 |

RICHARD J. HERBST, *Primary Examiner.*

G. P. CROSBY, *Assistant Examiner.*